(12) United States Patent
Bator et al.

(10) Patent No.: US 10,191,904 B2
(45) Date of Patent: *Jan. 29, 2019

(54) VISUALIZING RELATIONSHIPS BETWEEN DATA ELEMENTS AND GRAPHICAL REPRESENTATIONS OF DATA ELEMENT ATTRIBUTES

(71) Applicant: Ab Initio Technology LLC, Lexington, MA (US)

(72) Inventors: Erik Bator, Needham, MA (US); Joel Gould, Arlington, MA (US); Dusan Radivojevic, North Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,800

(22) Filed: Jan. 18, 2018

(65) Prior Publication Data

US 2018/0181567 A1 Jun. 28, 2018

Related U.S. Application Data

(63) Continuation of application No. 12/629,466, filed on Dec. 2, 2009, now Pat. No. 9,875,241.
(Continued)

(51) Int. Cl.
*G06F 17/00* (2006.01)
*G06F 17/30* (2006.01)

(52) U.S. Cl.
CPC .. *G06F 17/30017* (2013.01); *G06F 17/30572* (2013.01)

(58) Field of Classification Search
CPC ............... G06F 17/30017; G06F 17/30572
See application file for complete search history.

(56) References Cited

U.S. PATENT DOCUMENTS 6,003,040 A 12/1999 Mital et al.
6,725,227 B1 4/2004 Li
(Continued)

FOREIGN PATENT DOCUMENTS

CN 101084496 A 12/2007
EP 1258814 A1 11/2002
(Continued)

OTHER PUBLICATIONS

Australian Office Action in 2009-322441, dated Dec. 16, 2015, 4 pages.
(Continued)

*Primary Examiner* — Taelor Kim
(74) *Attorney, Agent, or Firm* — Wolf, Greenfield & Sacks, P.C.

(57) ABSTRACT

In general, metadata is stored in a data storage system. Summary data identifying one or more characteristics of each of multiple metadata objects stored in the data storage system is computed, and the summary data characterizing a given metadata object in association with the given metadata object is stored. A visual representation is generated of a diagram including nodes representing respective metadata objects and relationships among the nodes. Generating the visual representation includes superimposing a representation of a characteristic identified by the summary data characterizing a given metadata object in proximity to the node representing the given metadata object.

13 Claims, 9 Drawing Sheets

Related U.S. Application Data

(60) Provisional application No. 61/119,201, filed on Dec. 2, 2008.

(56) References Cited

U.S. PATENT DOCUMENTS

| | | |
|---|---|---|
| 7,401,064 B1 | 7/2008 | Arone et al. |
| 7,456,840 B2 | 11/2008 | Molesky et al. |
| 7,493,570 B2 | 2/2009 | Bobbin et al. |
| 7,546,226 B1 | 6/2009 | Yeh et al. |
| 7,590,672 B2 | 9/2009 | Slik et al. |
| 7,725,433 B1 | 5/2010 | Labrie |
| 7,844,582 B1 | 11/2010 | Arbilla et al. |
| 7,970,240 B1 | 6/2011 | Chao et al. |
| 8,266,122 B1 | 9/2012 | Newcombe et al. |
| 8,332,782 B1 | 12/2012 | Chang et al. |
| 8,577,852 B2 | 11/2013 | Haagenson et al. |
| 8,654,125 B2 | 2/2014 | Gibson |
| 8,819,010 B2 | 8/2014 | Fankhauser et al. |
| 9,875,241 B2 | 1/2018 | Bator et al. |
| 2002/0030703 A1 | 3/2002 | Robertson et al. |
| 2004/0181554 A1 | 9/2004 | Heckerman et al. |
| 2004/0255239 A1 | 12/2004 | Bhatt et al. |
| 2005/0246352 A1 | 11/2005 | Moore et al. |
| 2006/0095466 A1 | 5/2006 | Stevens et al. |
| 2006/0106847 A1 | 5/2006 | Eckardt et al. |
| 2006/0190844 A1 | 8/2006 | Binder et al. |
| 2006/0218159 A1 | 9/2006 | Murphy et al. |
| 2006/0271505 A1 | 11/2006 | Vierich et al. |
| 2006/0294150 A1 | 12/2006 | Stanfill et al. |
| 2007/0016624 A1 | 1/2007 | Powers et al. |
| 2007/0033220 A1 | 2/2007 | Drucker et al. |
| 2007/0061287 A1 | 3/2007 | Le et al. |
| 2007/0061353 A1 | 3/2007 | Bobbin et al. |
| 2007/0112875 A1 | 5/2007 | Yagawa |
| 2007/0150496 A1 | 6/2007 | Feinsmith |
| 2007/0255741 A1 | 11/2007 | Geiger et al. |
| 2008/0163124 A1 | 7/2008 | Bonev et al. |
| 2008/0172629 A1 | 7/2008 | Tien et al. |
| 2008/0183658 A1 | 7/2008 | Mangipudi |
| 2009/0012983 A1 | 1/2009 | Senneville et al. |
| 2009/0216728 A1 | 8/2009 | Brainerd et al. |
| 2010/0223430 A1 | 9/2010 | Walker et al. |
| 2011/0320460 A1 | 12/2011 | Fankhauser et al. |
| 2012/0059857 A1 | 3/2012 | Jackson, Jr. |
| 2012/0209656 A1 | 8/2012 | Rojahn |
| 2012/0254805 A1 | 10/2012 | Pic et al. |
| 2012/0310875 A1 | 12/2012 | Prahlad et al. |
| 2013/0332423 A1 | 12/2013 | Puri et al. |
| 2014/0019423 A1 | 1/2014 | Liensberger et al. |
| 2014/0114907 A1 | 4/2014 | Kozina et al. |
| 2016/0063106 A1 | 3/2016 | Chai et al. |

FOREIGN PATENT DOCUMENTS

| | | |
|---|---|---|
| EP | 1510937 A1 | 3/2005 |
| JP | 08033895 | 2/1996 |
| JP | 11307412 | 11/1999 |
| JP | 2002288403 A | 10/2002 |
| JP | 2005122703 A | 5/2005 |
| JP | 2008134705 A | 6/2008 |
| JP | 2008524671 A | 7/2008 |
| WO | WO 0182068 A1 | 11/2001 |
| WO | WO 0182072 A1 | 11/2001 |
| WO | WO 2005086906 | 9/2005 |
| WO | WO 2007002647 A2 | 1/2007 |
| WO | WO 2010065623 A1 | 6/2010 |

OTHER PUBLICATIONS

Chinese Office Action, Application No. 200980148414.6, dated May 10, 2013, 7 pages.
International Preliminary Report on Patentability, PCT/US2013/062369, dated Apr. 9, 2015 (8 pages).
International Search Report & Written Opinion issued in PCT application No. PCT/US09/66394, dated Jan. 20, 2010, 6 pages.
International Search Report & Written Opinion issued in PCT application No. PCT/US09/66390, dated Jan. 20, 2010, 7 pages.
International Search Report & Written Opinion, PCT/US2013/062369, dated Feb. 28, 2014, 10 pages.
International Search Report & Written Opinion, PCT/US2013/076407, dated Jun. 18, 2014, 8 pages.
International Search Report and Written Opinion in PCT/US14/26133, dated Aug. 21, 2014 (9 pages).
Japanese Office Action (with English translation), Application No. 2011-539652, dated Dec. 16, 2013, 8 pages.
Japanese Office Action (with English translation), Application No. 2011-539651, dated Oct. 11, 2013, 4 pages.
Japanese Office Action (with English translation), Application No. 2011-514796, dated Jun. 20, 2013, 9 pages.
Japanese Office Action (with English translation), Application No. 2011-539652, dated Nov. 14, 2014.
Japanese Office Action (with English translation), Application No. 2014-232962, dated Nov. 13, 2015.
Korean Office Action (with English translation), Application No. 10-2011-7013820, dated Oct. 21, 2015, 14 pages.
Korean Office Action (with English translation), Application No. 10-2011-7014656, dated Oct. 21, 2015, 14 pages.
Notification of Transmittal of the International Search Report and the Written Opinion of the International Searching Authority, or the Declaration, for Application No. PCT/US09/47735, dated Jul. 23, 2009, 6 pages.
Supplementary European Search Report in EP14768183 dated Oct. 4, 2016 (5 pages).
Supplementary European Search Report, EP 09767701, dated Sep. 25, 2012, 7 pages.
Supplementary European Search Report, EP 09831039, dated May 15, 2012, 9 pages.
Supplementary European Search Report, EP 09831042, dated May 4, 2012, 8 pages.
Transaction History, U.S. Appl. No. 12/143,362.
Transaction History, U.S. Appl. No. 12/629,483.
Transaction History, U.S. Appl. No. 13/835,199.
DePauw, W., et al., "Web Services Navigator: Visualizing the Execution of Web Services." IBM Systems Journal, vol. 44, No. 4, 2005, pp. 821-845.
Karr, Alan, et al., "Data quality: A Statistical Perspective," Statistical Methodology 3 (2006), pp. 137-173.
Nelson, Theodor Holm, "A Cosmology for a Different Computer Universe: Data Model, Mechanisms, Virtual Machine and Visualization Infrastructure," Journal of Digital Information, vol. 5, No. 1, 22 pages (2004).
Parker et al., Visualization of Large Nested Graphs in 3D: Navigation and Interaction, University of New Brunswick, Jul. 18, 2000; "http://com.unh.edu/vislab/PDFs/visualnav.pdf".
Robertson et al., "Polyarchy Visualization: Visualizing Multiple Intersecting Hierarchies," Computer Human Interaction—CHI , pp. 423-430, 2002.
Robertson, George G. "From Hierarchies to Polyarchies: Visualizing Multiple Relationships," Advanced Visual Interfaces 2000.
Takahashi, Kenji, "An Analysis of Requirements Elicitation Process," IEICE Technical Report, Institute of Electronics, Information and Communication Engineers, vol. 92, No. 128, 47:54 (1992).
EP 09767701, Sep. 25, 2012, Supplementary European Search Report.
EP 09831039, May 15, 2012, Supplementary European Search Report.
EP 09831042, May 4, 2012, Supplementary European Search Report.
EP14768183, Oct. 4, 2016, Supplementary European Search Report.
PCT/US09/47735, Jul. 23, 2009, Notification of Transmittal of the International Search Report and the Written Opinion.
PCT/US09/66390, Jan. 20, 2010, International Search Report & Written Opinion.
PCT/US09/66394, Jan. 20, 2010, International Search Report and Written Opinion.

(56) References Cited

OTHER PUBLICATIONS

PCT/US14/26133, Aug. 21, 2014, International Search Report and Written Opinion.
PCT/US2013/062369, Feb. 28, 2014, International Search Report & Written Opinion.
PCT/US2013/062369, Apr. 9, 2015, International Preliminary Report on Patentability.
PCT/US2013/076407, Jun. 18, 2014, International Search Report & Written Opinion.

VISUALIZING RELATIONSHIPS BETWEEN DATA ELEMENTS AND GRAPHICAL REPRESENTATIONS OF DATA ELEMENT ATTRIBUTES

CROSS-REFERENCE TO RELATED APPLICATIONS

This application is a continuation of and claims priority under 35 U.S.C. § 120 to U.S. patent application Ser. No. 12/629,466, filed Dec. 2, 2009, which claims priority to U.S. Application Ser. No. 61/119,201, filed on Dec. 2, 2008. Each of the above-listed applications is hereby incorporated by reference in its entirety.

BACKGROUND

This description relates to visualizing relationships between data elements and graphical representations of data element attributes.

Enterprises use complex data processing systems, such as data warehousing, customer relationship management, and data mining, to manage data. In many data processing systems, data are pulled from many different data sources, such as database files, operational systems, flat files, the Internet, etc, into a central repository. Often, data are transformed before being loaded in the data system. Transformation may include cleansing, integration, and extraction. To keep track of data, its sources, and the transformations that have happened to the data stored in a data system, metadata can be used. Metadata (sometimes called "data about data") are data that describe other data's attributes, format, origins, histories, inter-relationships, etc. Metadata management can play a central role in complex data processing systems.

Sometimes a database user may want to investigate how certain data are derived from different data sources. For example, a database user may want to know how a dataset or data object was generated or from which source a dataset or data object was imported. Tracing a dataset back to sources from which it is derived is called data lineage tracing (or "upstream data lineage tracing"). Sometimes a database user may want to investigate how certain datasets have been used (called "downstream data lineagetracing" or "impact analysis"), for example, which application has read a given dataset. A database user may also be interested in knowing how a dataset is related to other datasets. For example, a user may want to know if a dataset is modified, what tables will be affected.

SUMMARY

In a general aspect, a method includes storing metadata in a data storage system. Summary data identifying one or more characteristics of each of multiple metadata objects stored in the data storage system is computed, and the summary data characterizing a given metadata object in association with the given metadata object is stored. A visual representation is generated of a diagram including nodes representing respective metadata objects and relationships among the nodes. Generating the visual representation includes superimposing a representation of a characteristic identified by the summary data characterizing a given metadata object in proximity to the node representing the given metadata object.

Aspects can include one or more of the following features. The representation represents quality of the metadata object. The representation represents whether the metadata object has been recently updated. The representation represents a source from which the metadata object was last updated. The representation is associated with a legend that classifies the representation. Hovering a cursor over the visual representation generates a window containing information related to the representation. The representation represents a characteristic that is selectable by a user.

In a general aspect, a system includes means for storing metadata in a data storage system, and means for computing summary data identifying one or more characteristics of each of multiple metadata objects stored in the data storage system. A system also includes means for storing the summary data characterizing a given metadata object in association with the given metadata object, and means for generating a visual representation of a diagram including nodes representing respective metadata objects and relationships among the nodes. Generating the visual representation includes superimposing a representation of a characteristic identified by the summary data characterizing a given metadata object in proximity to the node representing the given metadata object.

In a general aspect, a computer system is configured to store metadata in a data storage system, and compute summary data identifying one or more characteristics of each of multiple metadata objects stored in the data storage system. The summary data characterizing a given metadata object in association with the given metadata object is stored, and a visual representation is generated of a diagram including nodes representing respective metadata objects and relationships among the nodes. Generating the visual representation includes superimposing a representation of a characteristic identified by the summary data characterizing a given metadata object in proximity to the node representing the given metadata object.

In a general aspect, a computer-readable medium stores a computer program, and the computer program includes instructions for causing a computer to store metadata in a data storage system. Summary data identifying one or more characteristics of each of multiple metadata objects stored in the data storage system is computed, and the summary data characterizing a given metadata object in association with the given metadata object is stored. A visual representation is generated of a diagram including nodes representing respective metadata objects and relationships among the nodes. Generating the visual representation includes superimposing a representation of a characteristic identified by the summary data characterizing a given metadata object in proximity to the node representing the given metadata object.

Aspects can have one or more of the following advantages.

The system enables users to visualize relationships between objects, and view certain attributes of objects in a contextual setting. When working with metadata, users are able to understand the origins of an object before certain actions are taken. Users can know which objects are affected by manipulation of any particular object. Users are also able to view attributes of certain objects in an environment where relationships between those objects are clearly shown.

DESCRIPTION

The system enables users to visualize relationships between objects, stored in a wide variety of data storage systems. The relationships among the objects can represent various dependencies and/or associations appropriate to the applications for which the data objects are used. As an example of one of the types of systems in which these techniques can be used, a system is described in which the objects represent elements of a graph-based computation environment.

Figure 1:
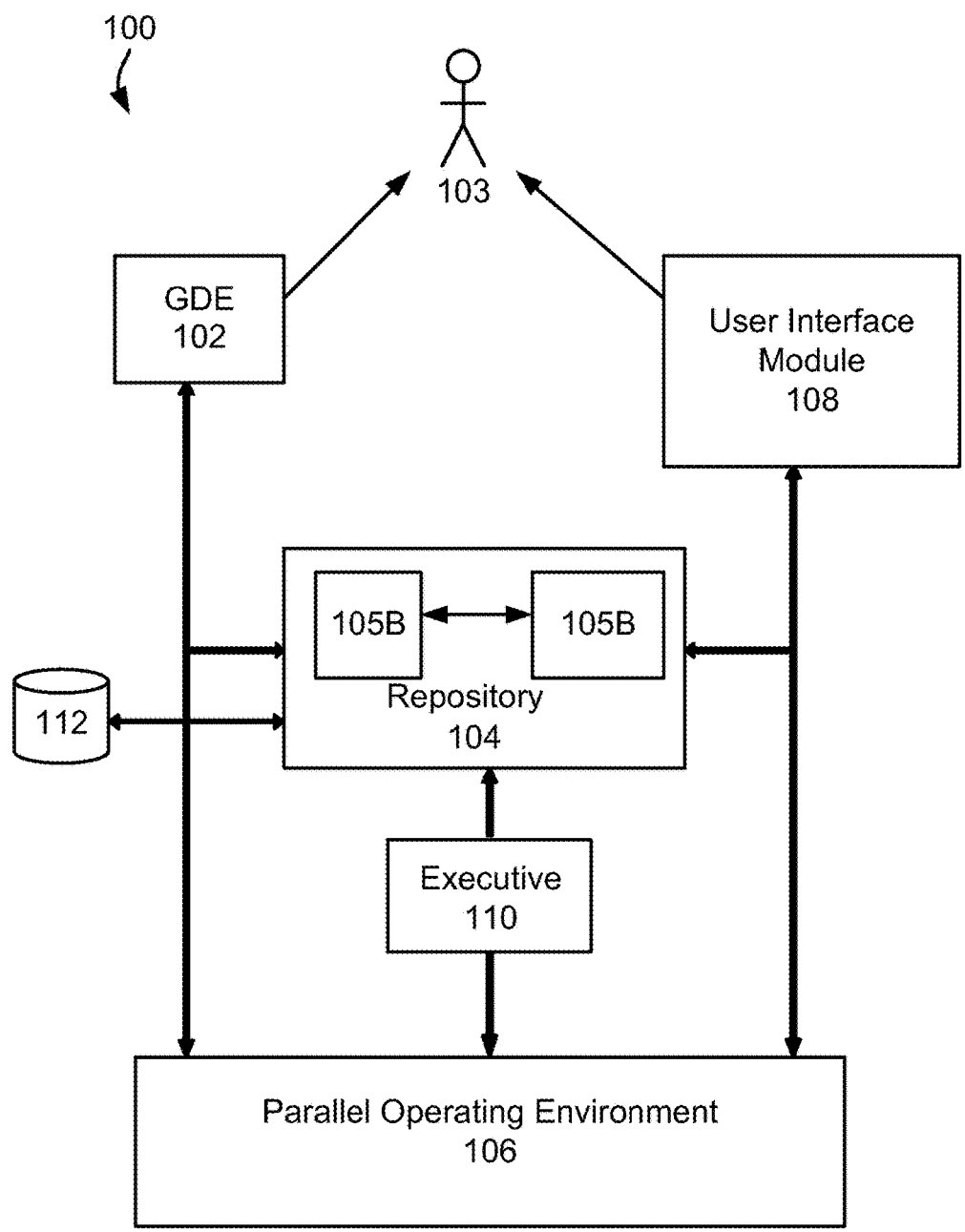
FIG. 1 is a block diagram of a computing system.

FIG. 1A is a block diagram showing the interrelationship of parts of a computing system 100 for developing, executing and managing graph-based computations. A graph-based computation is implemented using a "data flow graph" that is represented by a directed graph, with vertices in the graph representing components (either data files or processes), and the directed links or "edges" in the graph representing flows of data between components. A graphic development environment (GDE) 102 provides a user interface for specifying executable graphs and defining parameters for the graph components. The GDE may be, for example, the CO>OPERATING SYSTEM® GDE available from Ab Initio. The GDE 102 communicates with a repository 104 and a parallel operating environment 106. Also coupled to the repository 104 and the parallel operating environment 106 are a User Interface module 108 and an executive 110.

In some examples, repository 104 includes both a base data store 105A and an interface data store 105B. A base data store stores technical metadata, and may include applications along with their associated metadata, such as graphs and transforms. In addition to storing technical metadata, the base data store may also perform various kinds of analysis including dependency analysis (e.g., computing data lineage, as described in more detail below), or may receive and store the results of such analysis. In some examples, base data store 105A and interface data store 105B may be combined and implemented as a single data store.

While technical metadata is useful to developers in a variety of functions, there are many instances in which a higher level of metadata needs to be analyzed and manipulated. This higher level metadata, sometimes referred to as "enterprise" or "business" metadata is often useful in data analysis. Some examples of business metadata include data stewardship, which indicates which employee is responsible for the data, and data dictionaries, which are business definitions for files and fields within files. Business metadata goes beyond technical descriptions of data, and can be stored on a platform that is separate from the base data store 105A, such as an interface data store 105B.

The interface data store 105B may be a relational database that primarily serves to store business metadata. The interface data store may communicate with the base data store and extract its metadata, and it can also pull its information from a variety of other sources such as graphs, spreadsheets, logical models, database tables, or additional third party sources of data.

In some examples, the base data store 105A is a scalable object-oriented database system designed to support the development and execution of graph-based applications and the interchange of metadata between the graph-based applications and other systems (e.g., other operating systems). The repository 104 is a storage system for all kinds of metadata, including documentation, record formats (e.g., fields and data types of records in a table), transform functions, graphs, jobs, and monitoring information. The repository 104 also stores metadata objects that represent actual data to be processed by the computing system 100 including data stored in an external data store 112. An example of a repository that includes features for importing and managing metadata from various sources is described in co-pending U.S. Provisional Patent Application Ser. No. 61/119,148, entitled "DATA MAINTENANCE SYSTEM," filed on Dec. 2, 2008, incorporated herein by reference. Similar features can be incorporated into the repository 104.

The parallel operating environment 106 accepts a specification of a data flow graph generated in the GDE 102 and generates computer instructions that correspond to the processing logic and resources defined by the graph. The parallel operating environment 106 then typically executes those instructions on a plurality of processors (which need not be homogeneous). An example of a suitable parallel operating environment is the CO>OPERATING SYSTEM®.

The User Interface module 108 provides a web-browser-based view of the contents of the repository 104. Using the User Interface module 108, a user 103 may browse objects, create new objects, alter existing objects, specify application parameters, schedule jobs, etc. The User Interface module 108 generates forms-based browser screens for a user to search for and view objects and information about objects stored in the repository 104.

The repository 104 stores metadata including metadata objects for graph-based applications including graph components and other functional objects for building computation graphs. As stated previously, metadata stored in base data store 105A of repository 104 includes, for example, "technical" metadata (e.g., application-related business rules, record formats, and execution statistics), while the interface data store 105B may include business metadata such as user-defined documentation of job functions, roles, and responsibilities.

The information stored in the repository 104 in the form of metadata objects enables various kinds of analysis about applications and the data processed by those applications. Subsets of this information may be stored in interface data store 105B. For example, as discussed further below, a user can obtain answers to questions about data lineage (e.g., Where did a given value come from? How was the output value computed? Which applications produce and depend on this data?). A developer can understand the consequences of proposed modifications (e.g., If this piece changes, what else will be affected? If this source format changes, which applications will be affected?). A user/developer can also obtain questions to answers involving both technical metadata and business metadata (e.g., Which groups are responsible for producing and using this data? Who changed this application last? What changes did they make?).

The repository 104 is able to track the state of stored metadata objects. Objects stored in the repository 104 are versioned, making it possible to examine the state of things as of last week, last month, or last year, and to compare it with the state of things today. The repository 104 collects job-tracking, or execution information which enables trend analysis (e.g., How fast is our data growing?) and capacity planning (e.g., How long did that application take to run? How much data did it process, and at what rate? What resources did the application consume? When will we need to add another server?).

A user can view (and optionally, edit) information contained in and/or associated with the stored metadata through the User Interface module 108. A metadata viewing environment can represent various kinds of metadata objects using various graphical representations including icons and groupings of icons presented by the User Interface module 108 on a display. A metadata object can represent different types of data elements (e.g., data used as input or output of an executable program) and/or transformations (e.g., any type of data manipulation associated with a data processing entity, such as data flow graph, that processes or generates data). The viewing environment can show relationships as lines connecting graphical nodes that represent metadata objects or groupings of metadata objects, as described in more detail below. In some cases, the interface data store 105B can extract the relationships (such as lineage information) from the base data store 105A, or from other sources of data. The interface data store 105B may hold a high-level summary of data lineage. The lineage information (or other data dependency analysis) can be computed automatically within the system 100, or can be received from an external system, or from manual input. For example, the system 100 can receive lineage information that has been gathered and prepared by humans analyzing the code. The lineage information can be imported into the repository 104 from files in any of a variety of predetermined formats (e.g., in spreadsheets).

Figure 2A:
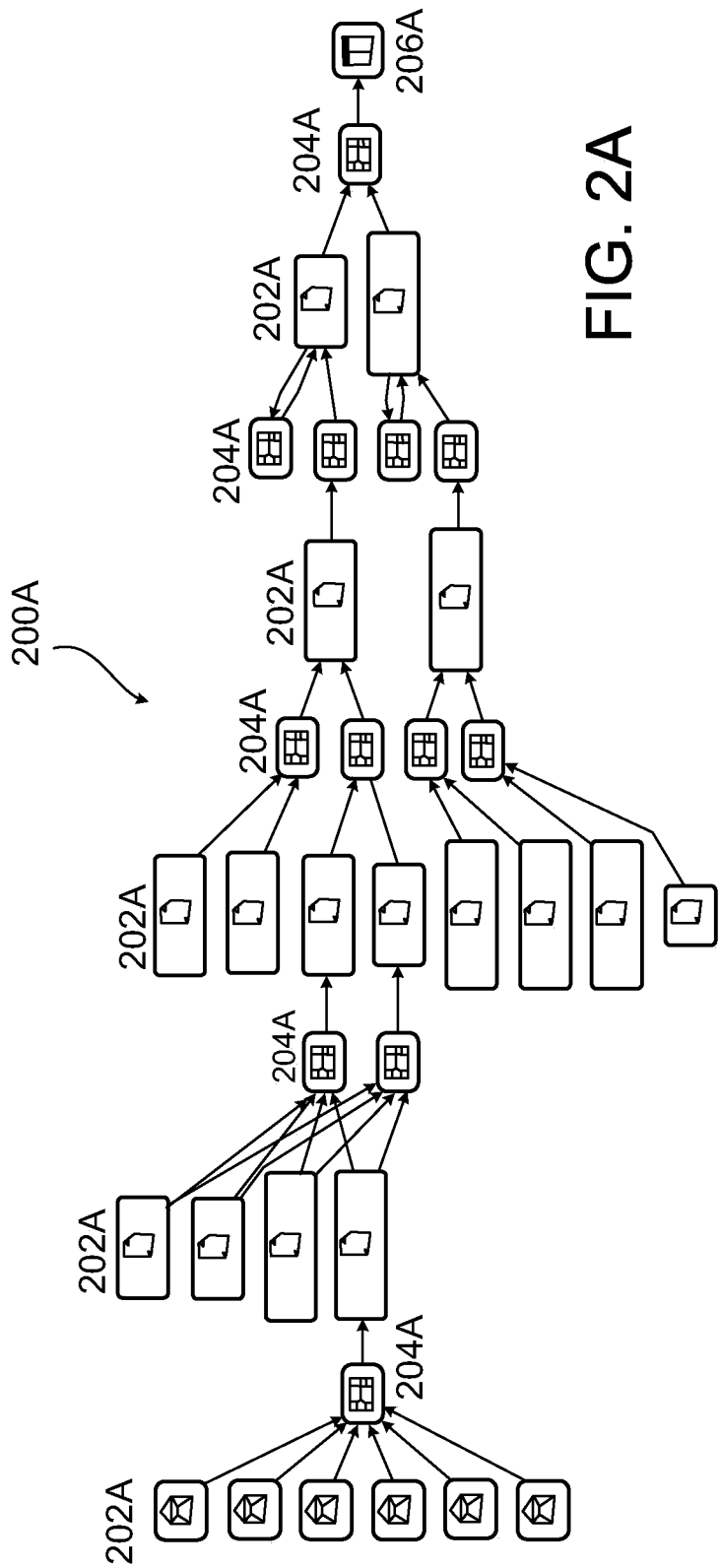
FIGS. 2A-2E are diagrams showing relationships between nodes of data.

FIG. 2A shows an example of a metadata viewing environment. In some examples, the metadata viewing environment is an interface that runs on top of a browser. In the example of FIG. 2A, the metadata viewing environment displays information related to a data lineage diagram 200A. One example of metadata viewing environment is a web-based application that allows a user to visualize and edit metadata. Using the metadata viewing environment, a user can explore, analyze, and manage metadata using a standard Web browser from anywhere within an enterprise. Each type of metadata object has one or more views or visual representations. The metadata viewing environment of FIG. 2A illustrates a lineage diagram for target element 206A.

For example, the lineage diagram displays the end-to-end lineage for the data and/or processing nodes that represent the metadata objects stored in the repository 104; that is, the objects a given starting object depends on (its sources) and the objects that a given starting object affects (its targets). In this example, connections are shown between data elements 202A and transformations 204A, two examples of metadata objects. The metadata objects are represented by nodes in the diagram. Data elements 202A can represent datasets, tables within datasets, columns in tables, and fields in files, messages, and reports, for example. An example of a transformation 204A is an element of an executable that describes how a single output of a data element is produced. The connections between the nodes are based on relationships among the metadata objects.

Figure 2B:
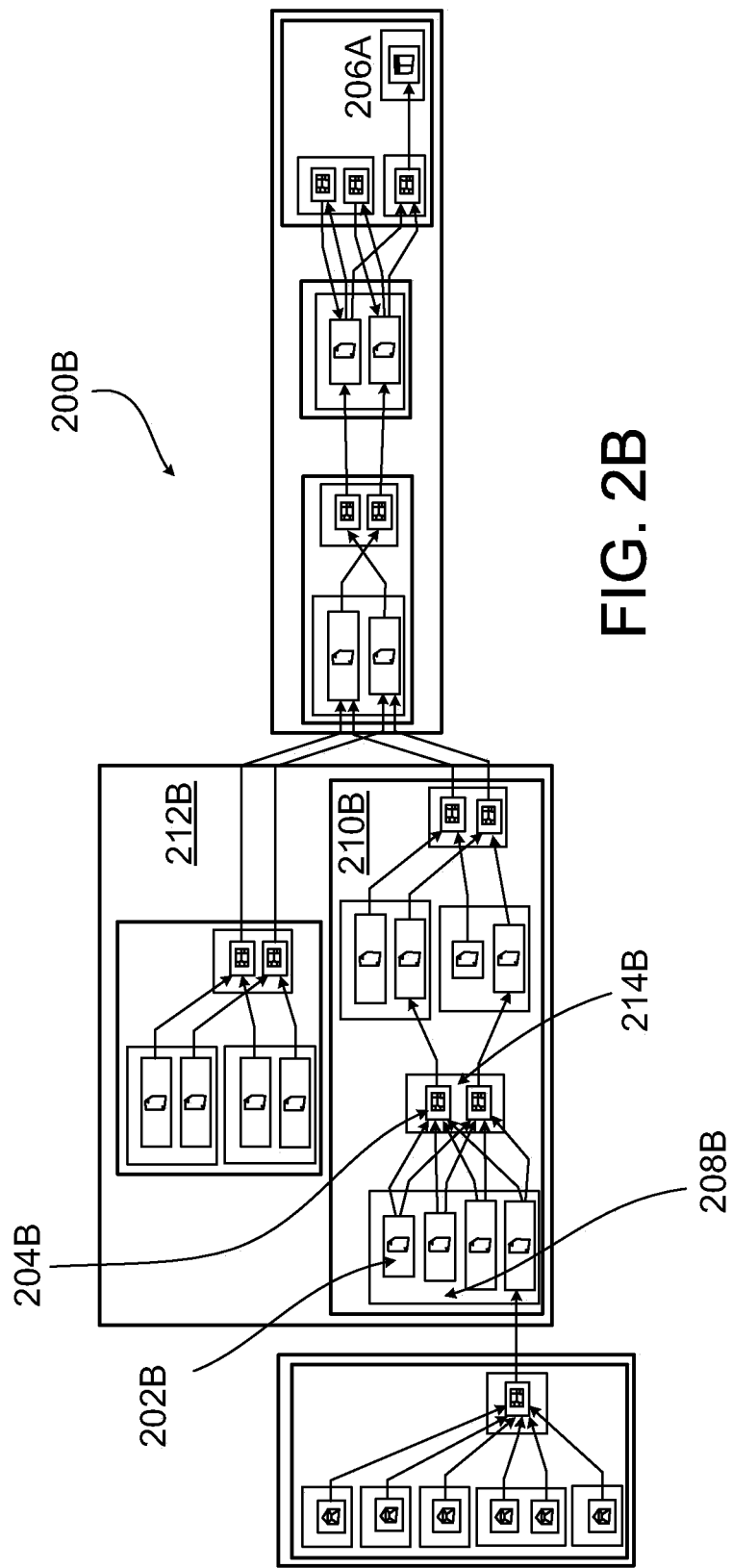

FIG. 2B is illustrates a corresponding lineage diagram 200B for the same target element 206A shown in FIG. 2A except each element 202B is grouped and shown in a group based on a context. For example, data elements 202B are grouped in datasets 208B (e.g., tables, files, messages, and reports), applications 210B (that contain executables such as graphs and plans and programs, plus the datasets that they operate on), and systems 212B. Systems 212B are functional groupings of data and the applications that process the data; systems consist of applications and data groups (e.g., databases, file groups, messaging systems, and groups of datasets). Transformations 204B are grouped in executables 214B, applications 210B, and systems 212B. Executables such as graphs, plans or programs, read and write datasets. Parameters can set what groups are expanded and what groups are collapsed by default. This allows users to see the details for only the groups that are important to them by removing unnecessary levels of details.

Using the metadata viewing environment to perform data lineage calculations is useful for a number of reasons. For example, calculating and illustrating relationships between data elements and transformations can help a user determine how a reported value was computed for a given field report. A user may also view which datasets store a particular type of data, and which executables read and write to that dataset. In the case of business terms, the data lineage diagram may illustrate which data elements (such as columns and fields) are associated with certain business terms (definitions in an enterprise).

Data lineage diagrams shown within the metadata viewing environment can also aid a user in impact analysis. Specifically, a user may want to know which downstream executables are affected if a column or field is added to a dataset, and who needs to be notified. Impact analysis may determine where a given data element is used, and can also determine the ramifications of changing that data element. Similarly, a user may view what datasets are affected by a change in an executable, or whether it safe to remove a certain database table from production.

Using the metadata viewing environment to perform data lineage calculations for generating data lineage diagrams is useful for business term management. For instance, it is often desirable for employees within an enterprise to agree on the meanings of business terms across that enterprise, the relationships between those terms, and the data to which the terms refer. The consistent use of business terms may enhance the transparency of enterprise data and facilitates communication of business requirements. Thus, it is important to know where the physical data underlying a business term can be found, and what business logic is used in computations.

Viewing relationships between data nodes can also be helpful in managing and maintaining metadata. For instance, a user may wish to know who changed a piece of metadata, what the source (or "source of record") is for a piece of metadata, or what changes were made when loading or reloading metadata from an external source. In maintaining metadata, it may be desirable to allow designated users to be able to create metadata objects (such as business terms), edit properties of metadata objects (such as descriptions and relationships of objects to other objects), or delete obsolete metadata objects.

The metadata viewing environment provides a number of graphical views of objects, allowing a user to explore and analyze metadata. For example, a user may view the contents of systems and applications and explore the details of any object, and can also view relationships between objects using the data lineage views, which allows a user to easily perform various types of dependency analysis such as the data lineage analysis and impact analysis described above. Hierarchies of objects can also be viewed, and the hierarchies can be searched for specific objects. Once the object is found bookmarks can be created for objects allowing a user to easily return to them.

With the proper permissions, a user can edit the metadata in the metadata viewing environment. For example, a user can update descriptions of objects, create business terms, define relationships between objects (such as linking a business term to a field in a report or column in a table), move objects (for instance, moving a dataset from one application to another) or delete objects.

Figure 2C:
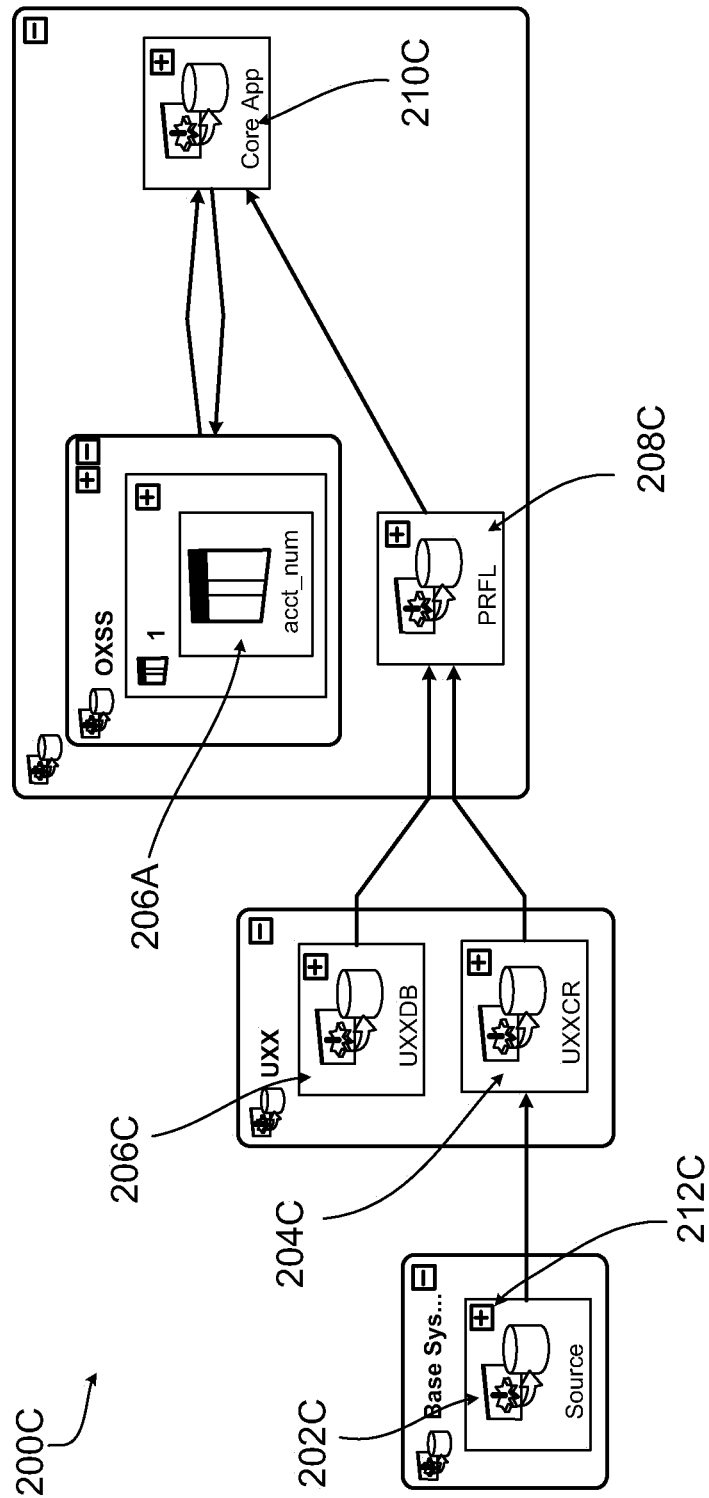

In FIG. 2C a corresponding lineage diagram 200C for target element 206A is shown, but the level of resolution is set to applications that are participating in the calculation for the target data element 206A. Specifically, applications 202C, 204C, 206C, 208C, and 210C are shown, as only those applications directly participate in the calculation for the target data element 206A. If a user wishes to view any part of the lineage diagram in a different level of resolution (e.g., to display more or less detail in the diagram), the user may activate the corresponding expand/collapse button 212C.

Figure 2D:
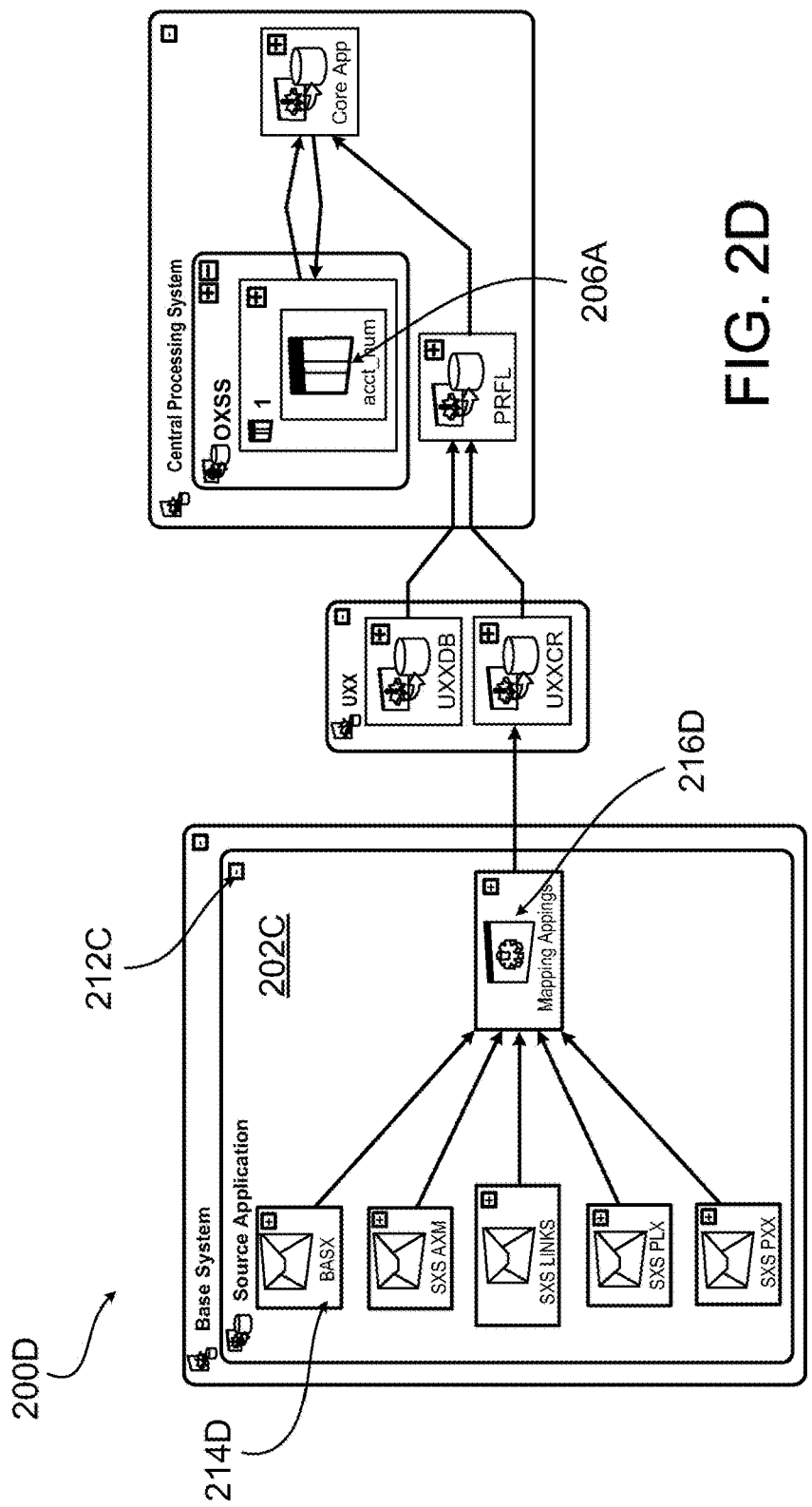

FIG. 2D shows a corresponding lineage diagram 200D at a different level of resolution. In this example, an expand/collapse button 212C has been activated by a user, and the metadata viewing environment now displays the same lineage diagram, but application 202C has been expanded to show the datasets 214D and executables 216D within application 202C.

Figure 2E:
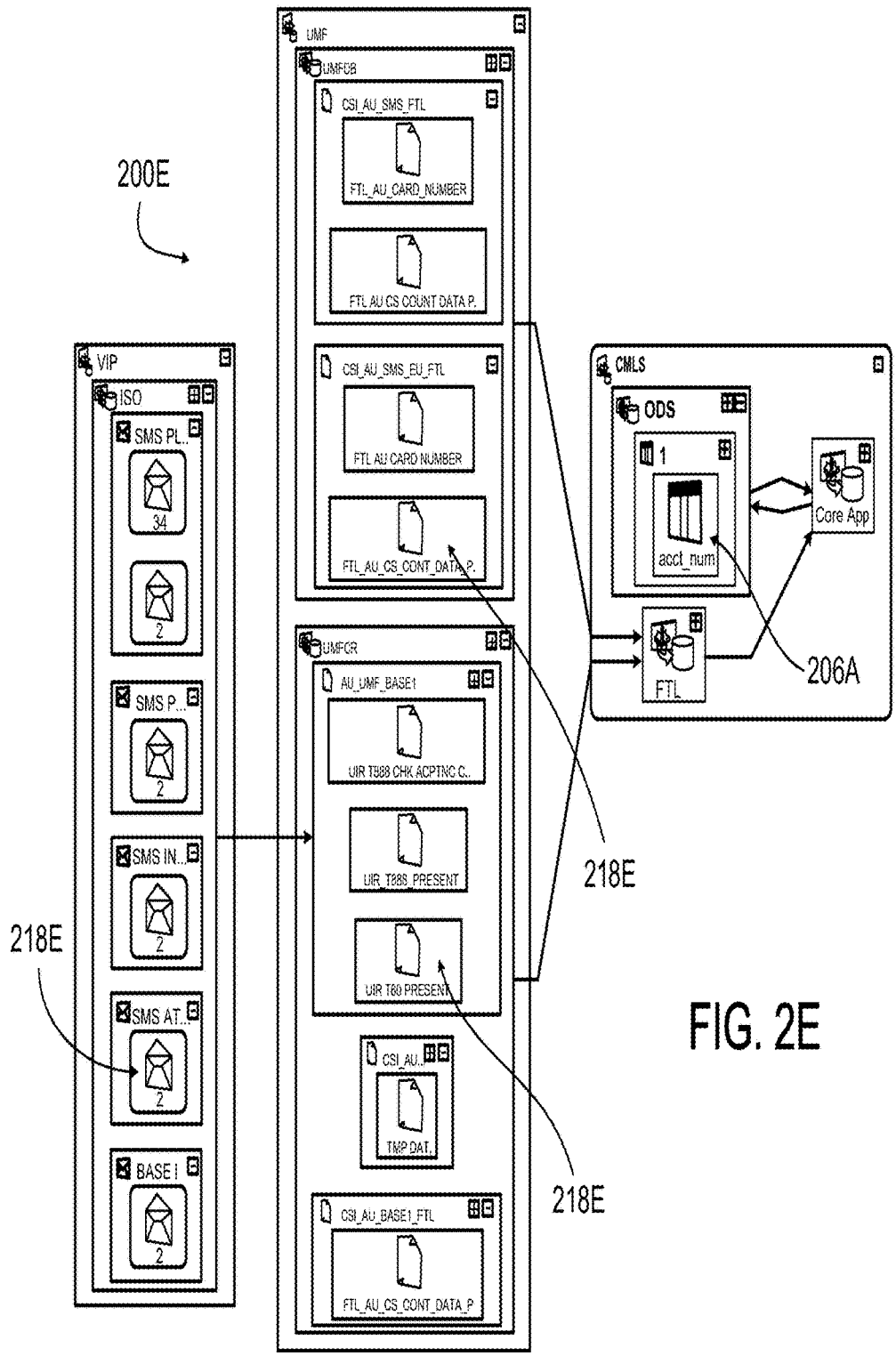

FIG. 2E shows a corresponding lineage diagram 200E at a different level of resolution. In this example, a user has selected to show everything expanded by a custom expansion. Any field or column which is an ultimate source of data (e.g., it has no upstream systems) is expanded. In addition, fields that have a specific flag set are also expanded. In this example, the specific flags are set on datasets and fields at a key intermediate point in the lineage, and one column is the column for which the lineage is being shown. The User Interface module 108 determines which nodes need to be collapsed and which nodes need to be excluded from the diagram entirely.

Users can also configure their own diagrams. For example, diagrams can be configured so that they follow primary/foreign key relationships in the metadata. Filters may also be applied to the dependency analysis to exclude information from the lineage diagram. For example, if a user desires to exclude datasets from the lineage diagram that are reject files, the user could toggle the display of reject files in the lineage diagram on and off.

Viewing elements and relationships in the metadata viewing environment can be made more useful by adding information relevant to each of the nodes that represent them. One exemplary way to add relevant information to the nodes is to graphically overlay information on top of certain nodes. These graphics may show some value or characteristic of the data represented by the node, and can be any property in the metadata database. This approach has the advantage of combining two or more normally disparate pieces of information (relationships between nodes of data and characteristics of the data represented by the nodes) and endeavors to put useful information "in context." For example, characteristics such as metadata quality, metadata freshness, or source of record information can be displayed in conjunction with a visual representation of relationships between data nodes. While some of this information may be accessible in tabular form, it may be more helpful for a user to view characteristics of the data along with the relationships between different nodes of data. A user can select which characteristic of the data will be shown on top of the data element and/or transformation nodes within the metadata viewing environment. Which characteristic is shown can also be set according to default system settings.

Figure 3:
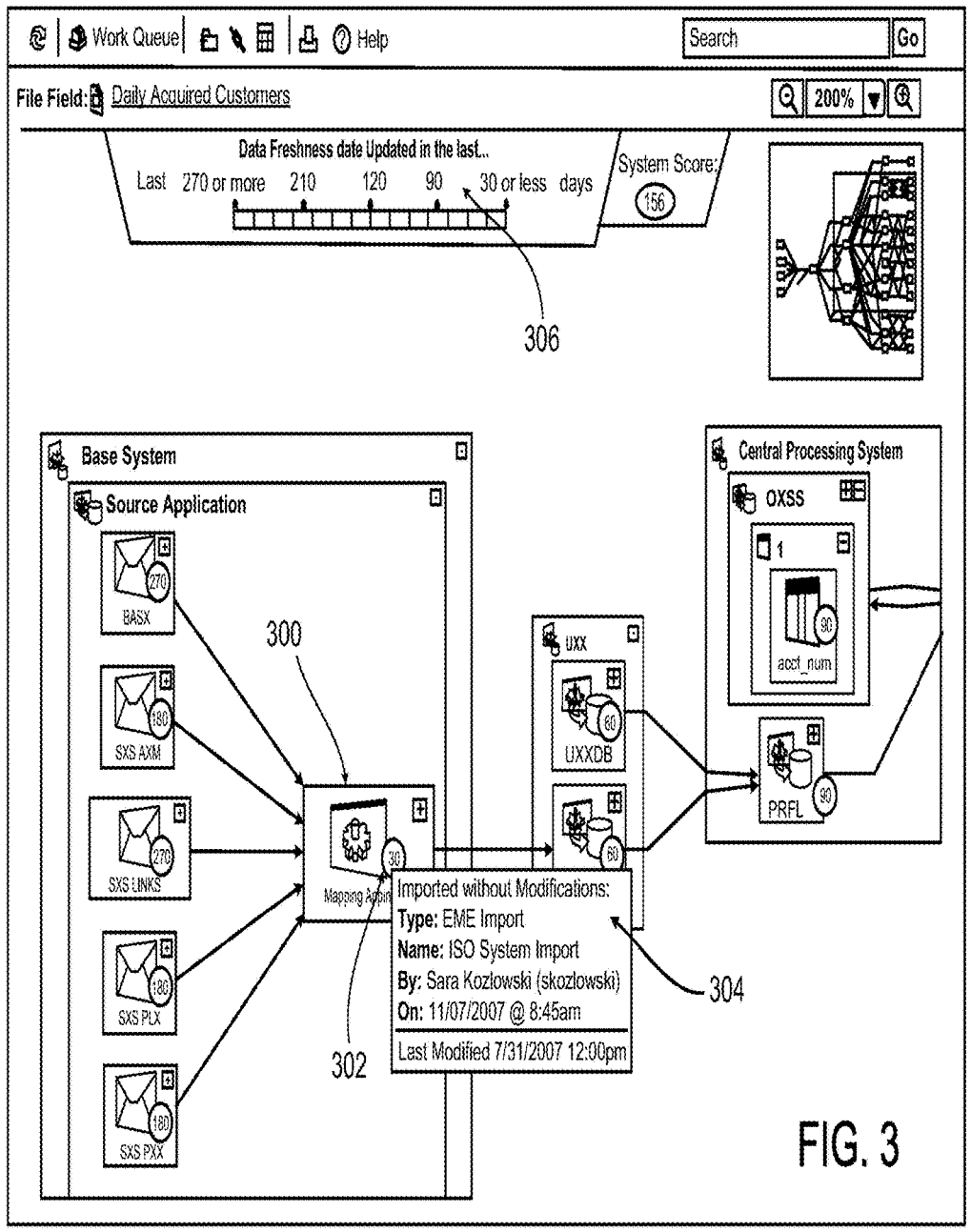
FIGS. 3-5 are diagrams showing graphical overlays superimposed on nodes of data.

In the example of FIG. 3, node 300 also displays a graphical overlay 302 that contains information pertaining to the freshness of the metadata represented by the node. The "metadata freshness" refers to how recently the metadata has been updated or modified from an external source. By "hovering" a cursor over graphical overlay 302, a window 304 can be called up that contains more detail about the characteristic currently displayed by the graphical overlay 302. The graphical overlays may be color-coded, with the different colors of the graphics mapping to different meanings via legend 306.

Figure 4:
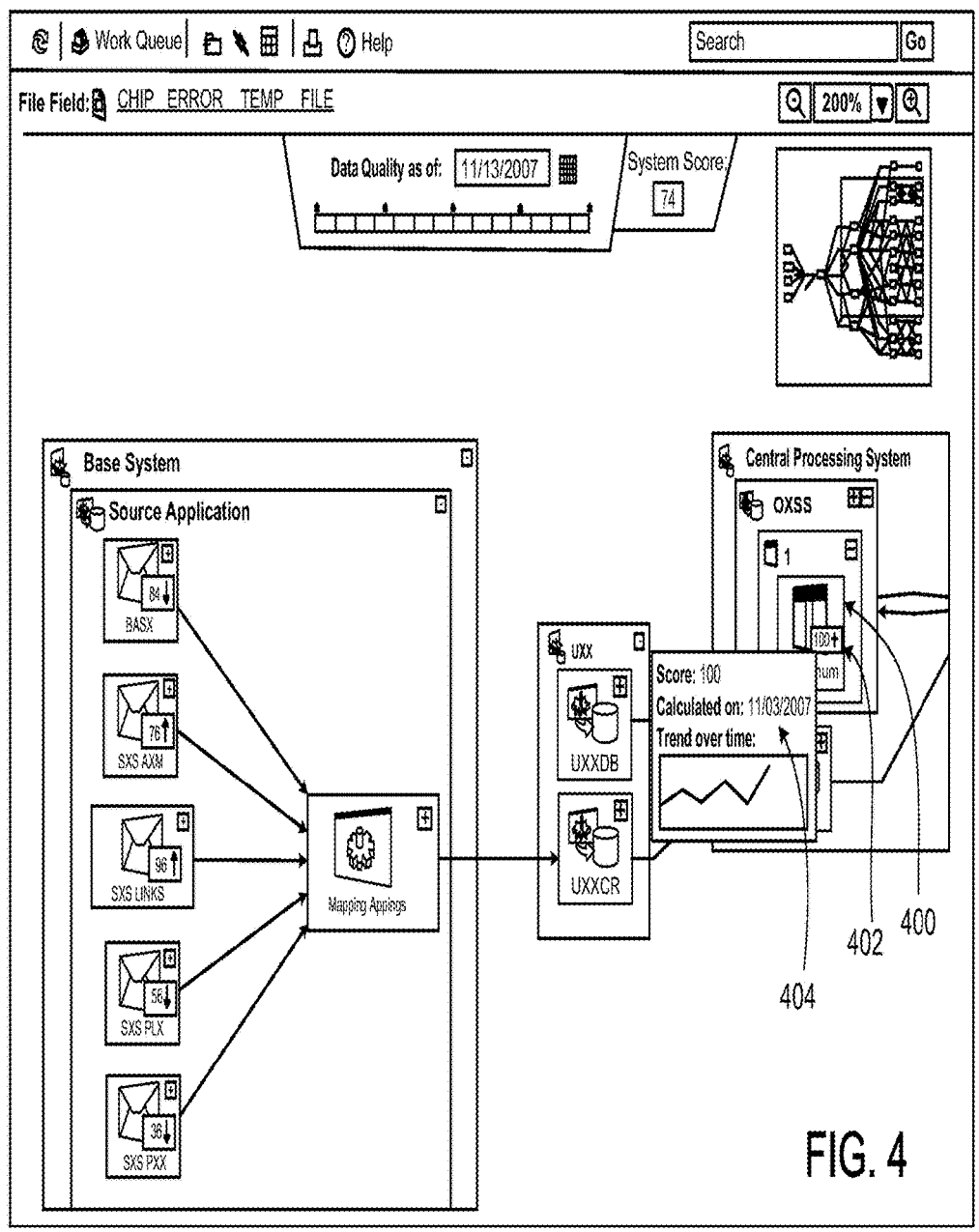

In the example of FIG. 4, graphical overlays representing levels of metadata quality are superimposed on top of data element nodes including overlay 402 on node 400. Measures of metadata quality can be used by a business, for example, to profile a periodic (e.g., monthly) data feed sent from a business partner before importing or processing the data. This would enable the business to detect "bad" data (e.g., data with a percentage of invalid values higher than a threshold) so it doesn't pollute an existing data store by actions that may be difficult to undo. Like the previous example, by hovering a cursor over graphical overlay 402, a window 404 can be called up that contains more detail about the characteristic currently displayed by the graphical overlay 402.

Figure 5:
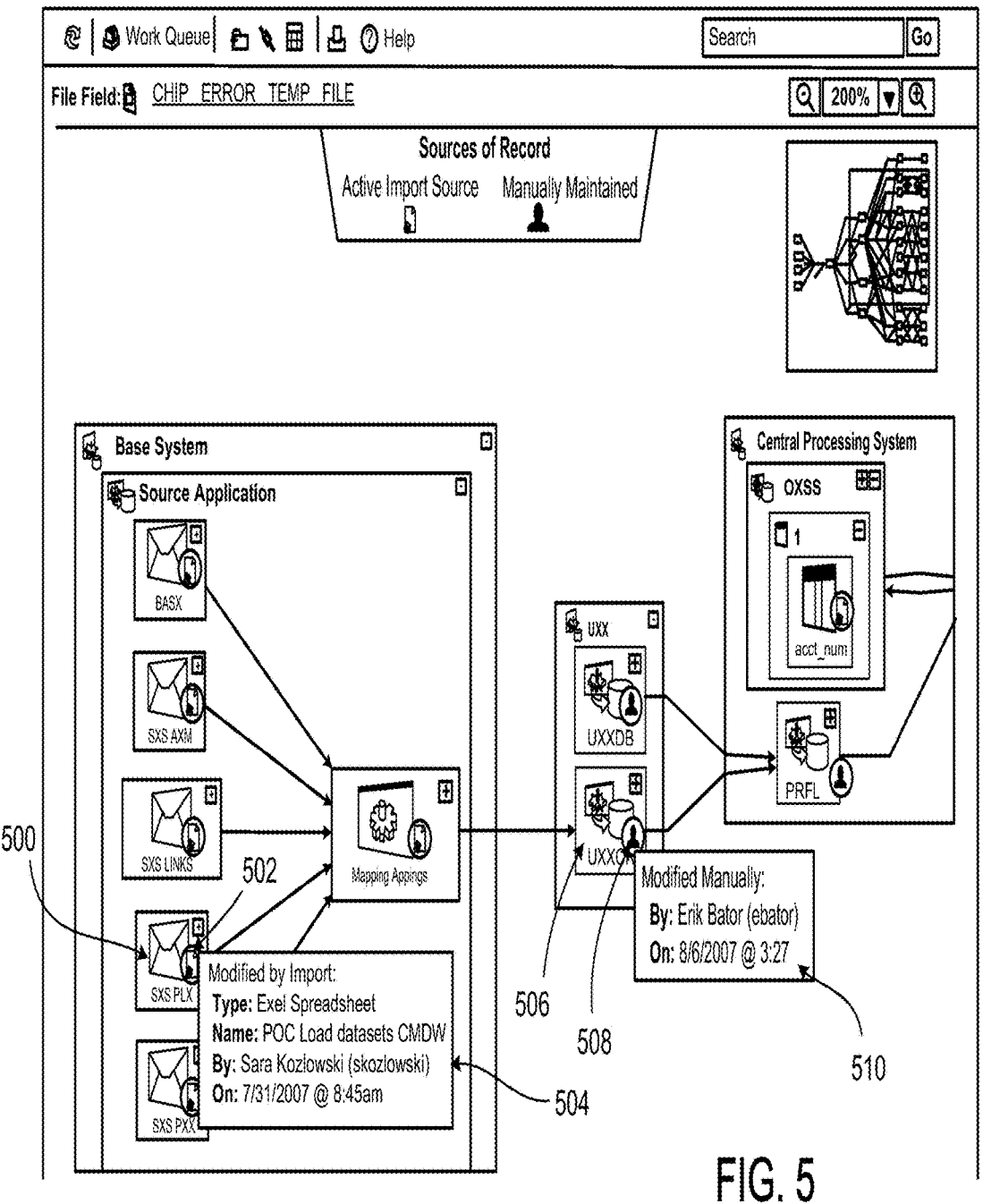

In the example of FIG. 5, graphical overlays representing the type of the source of record are superimposed on top of data element and transformation nodes. Node 500 has an overlay 502 that indicates the source of record is an "Active Import Source." This means that the metadata was imported automatically from a source such as a spreadsheet file. By hovering a cursor over graphical overlay 502, a window 504 can be called up that contains details such as the type of file used for the import (an Excel spreadsheet in this example), the name of the file, the owner of the file, and the date of the import. Node 506 has an overlay 508 that indicates the source of record is "Manually Maintained." This means that the metadata was modified manually by a user (e.g., using the User Interface Module 108). By hovering a cursor over the graphical overlay 508, a window 510 can be called up that contains details such as the name of the user that modified the metadata and the date of the modification.

The record storage and retrieval approach described above, including the modules of the system 100 and the procedures performed by the system 100, can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The approaches described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method including:
    storing, in a data storage system, a transformation object representing transformation of data and at least two dataset objects representing stored data in datasets;
    storing, in a data storage system, data lineage information linking the at least two dataset objects to the transformation object representing transformation of data;
    computing summary data for the transformation object, including computing an indication of how recently the transformation object has been updated or modified;
    generating a data lineage diagram that includes a visual representation of the data lineage information, in which the data lineage diagram includes at least two data element nodes that represent the at least two dataset objects, a transformation node that represents the transformation object, and directed links between each of the at least two data element nodes that represent a dataset object and the transformation node that represents the transformation object, wherein the directed links represent flows of data between the dataset objects and the transformation object; and
    including in the data lineage diagram, a representation of the summary data in proximity to the transformation node that represents the transformation object, in which the transformation node is connected to directed links representing flows of data between the dataset objects and the transformation object, wherein the representation of the summary data includes a representation of the indication of how recently the transformation object has been updated or modified.

2. The method of claim 1 in which the representation of the summary data is associated with a legend that classifies the representation of the summary data.

3. The method of claim 1 in which hovering a cursor over the visual representation generates a window containing information related to the representation of the summary data.

4. The method of claim 1 in which the representation of the summary data represents a characteristic that is selectable by a user.

5. A system including:
    means for storing, in a data storage system, a transformation object representing transformation of data and at least two dataset objects representing stored data in datasets;
    means for storing, in a data storage system, data lineage information linking the at least two dataset objects to the transformation object representing transformation of data;
    means for computing summary data for the transformation object, including computing an indication of how recently the transformation object has been updated or modified;
    means for generating a data lineage diagram that includes a visual representation of the data lineage information, in which the data lineage diagram includes at least two data element nodes that represent the at least two dataset objects, a transformation node that represents the transformation object, and directed links between each of the at least two data element nodes that represent a dataset object and the transformation node that represents the transformation object, wherein the directed links represent flows of data between the dataset objects and the transformation object; and
    means for including in the data lineage diagram, a representation of the summary data in proximity to the transformation node that represents the transformation object, in which the transformation node is connected to directed links representing flows of data between the dataset objects and the transformation object, wherein the representation of the summary data includes a representation of the indication of how recently the transformation object has been updated or modified.

6. A system for processing data, the system including a computer having one or more processors and at least one data storage system storing instructions that when executed by the computer causes the computer to perform:
    storing, in a data storage system, a transformation object representing transformation of data and at least two dataset objects representing stored data in datasets;
    storing, in a data storage system, data lineage information linking the at least two dataset objects to the transformation object representing transformation of data;
    computing summary data for the transformation object, including computing an indication of how recently the transformation object has been updated or modified;
    generating a data lineage diagram that includes a visual representation of the data lineage information, in which the data lineage diagram includes at least two data element nodes that represent the at least two dataset objects, a transformation node that represents the transformation object, and directed links between each of the at least two data element nodes that represent a dataset object and the transformation node that represents the transformation object, wherein the directed links represent flows of data between the dataset objects and the transformation object; and including in the data lineage diagram, a representation of the summary data in proximity to the transformation node that represents the transformation object, in which the transformation node is connected to directed links representing flows of data between the dataset objects and the transformation object, wherein the representation of the summary data includes a representation of the indication of how recently the transformation object has been updated or modified.

7. The system of claim 6 in which the representation of the summary data is associated with a legend that classifies the representation of the summary data.

8. The system of claim 6 in which hovering a cursor over the visual representation generates a window containing information related to the representation of the summary data.

9. The system of claim 6 in which the representation of the summary data represents a characteristic that is selectable by a user.

10. A computer-readable device storing a computer program, the computer program including executable instructions for causing a computer to:

store, in a data storage system, a transformation object representing transformation of data and at least two dataset objects representing stored data in datasets;

store, in a data storage system, data lineage information linking the at least two dataset objects to the transformation object representing transformation of data;

compute summary data for the transformation object, including computing an indication of how recently the transformation object has been updated or modified;

generate a data lineage diagram that includes a visual representation of the data lineage information, in which the data lineage diagram includes at least two data element nodes that represent the at least two dataset objects, a transformation node that represents the transformation object, and directed links between each of the at least two data element nodes that represent a dataset object and the transformation node that represents the transformation object, wherein the directed links represent flows of data between the dataset objects and the transformation object; and supplement the data lineage diagram with a representation of the summary data in proximity to the transformation node that represents the transformation object, in which the transformation node is connected to directed links representing flows of data between the dataset objects and the transformation object, wherein the representation of the summary data includes a representation of the indication of how recently the transformation object has been updated or modified.

11. The computer-readable device of claim 10, wherein the representation of the summary data is associated with a legend that classifies the representation of the summary data.

12. The computer-readable device of claim 10, wherein the computer program further includes executable instructions for causing the computer to enable a cursor to be hovered over the visual representation to generate a window containing information related to the representation of the summary data.

13. The computer-readable device of claim 10, wherein the representation of the summary data represents a characteristic that is selectable by a user.

* * * * *